United States Patent
Wong (10) Patent No.: US 12,335,561 B2
(45) Date of Patent: *Jun. 17, 2025

(54) SMART TV OPERATING SYSTEM ARRANGEMENTS FOR LOCAL NETWORK CONNECTED TELEVISION RECEIVERS

(71) Applicant: DISH Network L.L.C., Englewood, CO (US)

(72) Inventor: Kan Man Wong, Littleton, CO (US)

(73) Assignee: DISH Network L.L.C., Englewood, CO (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/335,276

(22) Filed: Jun. 15, 2023

(65) Prior Publication Data

US 2023/0336811 A1    Oct. 19, 2023

Related U.S. Application Data

(63) Continuation of application No. 17/556,723, filed on Dec. 20, 2021, now Pat. No. 11,716,501.

(Continued)

(51) Int. Cl.
*H04N 21/433*   (2011.01)
*G06F 8/41*    (2018.01)
(Continued)

(52) U.S. Cl.
CPC .............. *H04N 21/433* (2013.01); *G06F 8/45* (2013.01); *G06F 8/451* (2013.01); *G06F 8/453* (2013.01);
(Continued)

(58) Field of Classification Search
None
See application file for complete search history.

(56) References Cited

U.S. PATENT DOCUMENTS

| 7,617,515 B1 | 11/2009 | Laksono |
| 8,863,202 B2 | 10/2014 | Agnihotri |

(Continued)

FOREIGN PATENT DOCUMENTS

| CN | 108259231 A  | 7/2018 |
| WO | 2017102389 A1 | 6/2017 |

OTHER PUBLICATIONS

SilverStar Satellite, DISH Network Hopper 3 Demo by SilverStar Satellite, YouTube, https://www.youtube.com/watch?v=Yd2d-cj2ZyQ (Year: 2016), 3 pages.

(Continued)

*Primary Examiner* — Junior O Mendoza
(74) *Attorney, Agent, or Firm* — Kilpatrick Townsend & Stockton LLP (57) ABSTRACT

Various arrangements for facilitating smart television content receivers are provided. A primary television receiver (PTR) having a first operating system may be configured to receive digital content from a remote content provider and distribute the content to one or more devices in response to a request for the content. A secondary television receiver (STR) configured to be in communication with a PTR and having a second operating system may be configured to receive the digital content from the PTR and provide the content to a display for presentation. The STR may include a first software stack including a first inter-process communication (IPC) mechanism, and a second software stack including the first IPC mechanism and a second IPC mechanism. The first IPC may support communication within the first stack as well as between the first stack and the second stack. The second IPC may support communication within the second stack.

20 Claims, 5 Drawing Sheets

Related U.S. Application Data (60) Provisional application No. 63/232,552, filed on Aug. 12, 2021.

(51) Int. Cl.

| | | |
|---|---|---|
| *G06F 8/70* | (2018.01) | |
| *G06F 9/44* | (2018.01) | |
| *G06F 9/451* | (2018.01) | |
| *G10L 15/22* | (2006.01) | |
| *H04B 7/185* | (2006.01) | |
| *H04L 41/0893* | (2022.01) | |
| *H04L 61/5014* | (2022.01) | |
| *H04L 65/611* | (2022.01) | |
| *H04N 21/238* | (2011.01) | |
| *H04N 21/262* | (2011.01) | |
| *H04N 21/2665* | (2011.01) | |
| *H04N 21/4363* | (2011.01) | |
| *H04N 21/45* | (2011.01) | |
| *H04N 21/462* | (2011.01) | |
| *H04N 21/475* | (2011.01) | |
| *H04N 21/478* | (2011.01) | |
| *H04N 21/61* | (2011.01) | |
| *H04N 21/81* | (2011.01) | |
| *G06F 9/445* | (2018.01) | |
| *H04L 101/668* | (2022.01) | |

(52) U.S. Cl.
CPC .............. *G06F 8/70* (2013.01); *G06F 9/44* (2013.01); *G06F 9/451* (2018.02); *G10L 15/22* (2013.01); *H04B 7/18523* (2013.01); *H04L 41/0893* (2013.01); *H04L 61/5014* (2022.05); *H04L 65/611* (2022.05); *H04N 21/238* (2013.01); *H04N 21/26291* (2013.01); *H04N 21/2665* (2013.01); *H04N 21/43637* (2013.01); *H04N 21/4516* (2013.01); *H04N 21/4518* (2020.08); *H04N 21/4622* (2013.01); *H04N 21/475* (2013.01); *H04N 21/478* (2013.01); *H04N 21/6106* (2013.01); *H04N 21/6118* (2013.01); *H04N 21/6125* (2013.01); *H04N 21/6143* (2013.01); *H04N 21/818* (2013.01); *G06F 9/44521* (2013.01); *G10L 2015/223* (2013.01); *H04L 2101/668* (2022.05)

(56) References Cited

U.S. PATENT DOCUMENTS

| | | | |
|---|---|---|---|
| 10,091,065 | B1 | 10/2018 | Gast |
| 10,349,059 | B1 | 7/2019 | Good |
| 11,122,325 | B1 | 9/2021 | Gupta et al. |
| 11,184,660 | B1 | 11/2021 | Ewanchuk |
| 11,227,620 | B2 | 1/2022 | Igarashi |
| 11,330,335 | B1 | 5/2022 | Loritsch |
| 11,716,501 | B2 * | 8/2023 | Wong ............... H04N 21/6143 725/132 |
| 2006/0200849 | A1 * | 9/2006 | Sundarrajan ......... H04L 69/163 725/110 |
| 2007/0174635 | A1 | 7/2007 | Jones |
| 2009/0254639 | A1 | 10/2009 | Manchester et al. |
| 2009/0316706 | A1 | 12/2009 | Hawley et al. |
| 2010/0037271 | A1 | 2/2010 | Crowe |
| 2010/0235869 | A1 | 9/2010 | Zhao et al. |
| 2011/0158149 | A1 | 6/2011 | Mugulavalli et al. |
| 2012/0019732 | A1 | 1/2012 | Lee |
| 2012/0173746 | A1 | 7/2012 | Salinger et al. |
| 2013/0031592 | A1 * | 1/2013 | Choi ................. H04N 21/4405 725/110 |
| 2013/0129324 | A1 | 5/2013 | Uro et al. |
| 2013/0185761 | A1 | 7/2013 | Friel et al. |
| 2013/0223441 | A1 | 8/2013 | Meyer |
| 2014/0075467 | A1 | 3/2014 | Chritudass et al. |
| 2014/0153489 | A1 | 6/2014 | Perras |
| 2014/0227976 | A1 | 8/2014 | Callaghan et al. |
| 2017/0019372 | A1 | 1/2017 | Panje |
| 2017/0026712 | A1 | 1/2017 | Gonder et al. |
| 2017/0155580 | A1 | 6/2017 | Ramanujan |
| 2017/0180790 | A1 | 6/2017 | Howard |
| 2017/0251026 | A1 | 8/2017 | Straub et al. |
| 2017/0331885 | A1 | 11/2017 | Jakatdar et al. |
| 2018/0070129 | A1 | 3/2018 | Cholas et al. |
| 2018/0146113 | A1 | 5/2018 | Takahashi |
| 2018/0176101 | A1 | 6/2018 | Stephenson et al. |
| 2019/0090154 | A1 | 3/2019 | Olderdissen |
| 2019/0166387 | A1 | 5/2019 | Perez |
| 2020/0379747 | A1 | 12/2020 | Kaartinen et al. |
| 2021/0051091 | A1 | 2/2021 | Joseph et al. |
| 2021/0127168 | A1 | 4/2021 | Perez |
| 2021/0219017 | A1 | 7/2021 | Pattison et al. |
| 2021/0241764 | A1 | 8/2021 | Shin |
| 2021/0385550 | A1 | 12/2021 | Jothilingham |
| 2022/0385988 | A1 | 12/2022 | DiNatale |
| 2023/0052067 | A1 | 2/2023 | Chu et al. |

OTHER PUBLICATIONS

Thomson, et al., "IPv6 Stateless Address Autoconfiguration" Standard Track, Sep. 2007, 30 pages.

* cited by examiner

SMART TV OPERATING SYSTEM ARRANGEMENTS FOR LOCAL NETWORK CONNECTED TELEVISION RECEIVERS

CROSS REFERENCE TO RELATED APPLICATIONS

This application is a continuation of U.S. Non-Provisional patent application Ser. No. 17/556,723, filed on Dec. 20, 2021, entitled "SMART OPERATING SYSTEM ARRANGEMENTS FOR LOCAL NETWORK CONNECTED TELEVISION RECEIVERS," which claims priority to U.S. Provisional Patent Application No. 63/232,552, filed on Aug. 12, 2021, entitled "SYSTEMS AND METHODS FOR FACILITATING SMART TV CONTENT RECEIVERS IN A LOCAL NETWORK," the disclosures of which are hereby incorporated by reference in their entireties for all purposes.

BACKGROUND

Television content receivers may be configured to receive and distribute digital content from a remote content provider within a local network of television content receivers. Smart television operating systems may provide users access to digital content from additional content providers as well as other computing functionalities, such as voice assistants and smart home integrations. As smart devices, digital content providers, and smart televisions become more ubiquitous, it can be possible to integrate smart television functionalities into local network connected television content receivers. Integrating smart television functionalities into local network connected television content receivers may improve user satisfaction and reduce technological complexities.

SUMMARY

Various embodiments are described related to a smart television receiver system. The system may comprise a secondary television receiver having a first operating system installed. The secondary television receiver may comprise a first software stack installed on a kernel of the first operating system. The first software stack may comprise a first plurality of processes that executes in the first software stack and a first inter-process communication mechanism. In some embodiments, each process of the first plurality of processes uses the first inter-process communication mechanism to communicate with other processes of the first plurality of processes. The secondary television receiver may further comprise a second software stack installed on the kernel of the first operating system. The second software stack may comprise a second plurality of processes that executes in the second software stack, the first inter-process communication mechanism, and a second inter-process communication mechanism. In some embodiments, processes of the second plurality of processes use the first inter-process communication mechanism to communicate with the first plurality of processes and the second inter-process communication mechanism to communicate with other processes of the second plurality of processes. The system may further comprise a primary television receiver having a second operating system installed that is different from the first operating system. The primary television receiver may be configured to receive digital content from a remote content provider and provide the digital content from the remote content provider to the secondary television receiver in response to a request received by the primary television receiver from the secondary television receiver.

In some embodiments, the first software stack further comprises a first library configured to provide the first inter-process communication mechanism to the first software stack and the second software stack further comprises a second library configured to provide the second inter-process communication mechanism to the second software stack. In some embodiments, the first inter-process communication mechanism uses Binder inter-process communications and the second inter-process communication mechanism uses System V inter-process communications. In some embodiments, the second software stack further comprises a first driver configured to provide a network interface to the first software stack. In some embodiments, the primary television receiver and the secondary television receiver are communicatively coupled using a coaxial cable and the second software stack further comprises a first driver configured to provide a network interface between the first software stack and the primary television receiver via the coaxial cable. The system may further comprise a satellite antenna communicatively coupled to the primary television receiver, wherein the satellite antenna is configured to provide a connection between the primary television receiver and the remote content provider.

In some embodiments, the secondary television receiver sends data to, and receives data from, the Internet via only the primary television receiver. In some embodiments, a first process of the second plurality of processes is configured to transmit a first tuning request to the primary television receiver and the primary television receiver comprises a tuner configured to tune, in response to the primary television receiver receiving the first tuning request, a frequency at which a plurality of television channels are received. The system may further comprise a television communicatively coupled to the secondary television receiver, wherein a first process of the second plurality of processes is configured to receive the digital content from the primary television receiver and transmit the digital content to the television for display by the television. In some embodiments, one or more of the second plurality of processes are configured to be executable by the second operating system of the primary television receiver.

In some embodiments, a smart television receiver is described. The smart television receiver may comprise a first operating system installed on the smart television receiver. The smart television receiver may further comprise a first software stack installed on a kernel of the first operating system. The first software stack may comprise a first plurality of processes that are executed in the first software stack and a first inter-process communication mechanism. In some embodiments, each process of the first plurality of processes is configured to use the first inter-process communication mechanism to communicate with other processes of the first plurality of processes. The smart television receiver may further comprise a second software stack installed on the kernel of the first operating system. The second software stack may comprise a second plurality of processes that are executed in the second software stack, the first inter-process communication mechanism, and a second inter-process communication mechanism. In some embodiments, processes of the second plurality of processes are configured to use the first inter-process communication mechanism to communicate with the first plurality of processes and the second inter-process communication mechanism to communicate with other processes of the second plurality of processes. In some embodiments, the smart television receiver is configured to receive digital content from a remote content provider and provide the digital content to a display communicatively coupled with the smart television receiver for presentation.

In some embodiments, the first software stack further comprises a first library configured to provide the first inter-process communication mechanism to the first software stack and the second software stack further comprises a second library configured to provide the second inter-process communication mechanism to the second software stack. In some embodiments, the smart television receiver is further configured to be communicatively coupled to a primary television receiver. The primary television receiver may be configured to receive the digital content from the remote content provider and provide the digital content to the smart television receiver. In some embodiments, the smart television receiver is further configured to be communicatively coupled to the primary television receiver using a coaxial cable and the second software stack further comprises a first driver configured to provide a network interface between the first software stack and the primary television receiver via the coaxial cable.

In some embodiments, the smart television receiver is further configured to send data to, and receive data from, the Internet via only the primary television receiver. In some embodiments, a first process of the second plurality of processes is configured to transmit a first tuning request to the primary television receiver and the primary television receiver comprises a tuner configured to tune, in response to the primary television receiver receiving the first tuning request, a frequency at which a plurality of television channels are received. In some embodiments, one or more of the second plurality of processes are configured to be executable by a second operating system installed on the primary television receiver.

In some embodiments, a method for facilitating smart television content is described. The method may comprise installing a primary television receiver having a first operating system installed. The primary television receiver may be configured to receive digital content from a remote content provider and distribute the digital content to one or more devices in communication with the primary television receiver in response to a request for the digital content. The method may further comprise installing a secondary television receiver having a second operating system installed. The secondary television receiver may be configured to receive the digital content from the primary television receiver and provide the digital content to a display communicatively coupled with the secondary television receiver for presentation. The method may further comprise configuring the secondary television receiver to be in communication with the primary television receiver. The method may further comprise executing, on the secondary television receiver, a first software stack. In some embodiments, the first software stack comprises a first plurality of processes that executes in the first software stack and a first inter-process communication mechanism and each process of the first plurality of processes is configured to use the first inter-process communication mechanism to communicate with other processes of the first plurality of processes. The method may further comprise executing, on the secondary television receiver, a second software stack. In some embodiments, the second software stack comprises a second plurality of processes that executes in the second software stack, the first inter-process communication mechanism, and a second inter-process communication mechanism and processes of the second plurality of processes are configured to use the first inter-process communication mechanism to communicate with the first plurality of processes and the second inter-process communication mechanism to communicate with other processes of the second plurality of processes.

BRIEF DESCRIPTION OF THE DRAWINGS

A further understanding of the nature and advantages of various embodiments may be realized by reference to the following figures. In the appended figures, similar components or features may have the same reference label. Further, various components of the same type may be distinguished by following the reference label by a dash and a second label that distinguishes among the similar components. If only the first reference label is used in the specification, the description is applicable to any one of the similar components having the same first reference label irrespective of the second reference label.

DETAILED DESCRIPTION

Smart television content receivers may be configured for local computing environments, such wired or wireless local networks, that may include one or more primary television receivers and one or more secondary television receivers. Secondary television receivers in accordance with disclosed embodiments may be able to operate and stream audio video (A/V) content without communicating directly to a cloud server or the internet. Instead, a set of software applications and/or processes may configure the secondary television receivers to obtain the majority or all of their content from a primary television receiver with which the secondary television receivers form a closed relationship in the local computing network. The set of software applications and/or processes may be configured to interact and communicate with other applications and/or processes using one or more predefined inter process communication (IPC) mechanisms.

In addition to streaming A/V content from a primary television receiver, secondary television receivers in accordance with disclosed embodiments may be configured to provide one or more smart TV functionalities, such as access to one or more applications, voice assistants, games, and/or other digital content. The smart TV functionalities may be included, and/or accessible through, a particular operating system installed on the secondary television receiver. The operating system may provide a set of processes and a particular IPC mechanism that enables the processes to communicate and interact with each other.

However, integrating the set of software applications and/or processes configured to obtain the A/V content from the primary television receiver with the smart TV operating system may pose several unique challenges. First, the IPC mechanism provided by the smart TV operating system may not be the same IPC mechanism used by the set of applications configured to obtain the A/V content from the primary television receiver. Further, the smart TV operating system may not include one or more libraries that support the IPC mechanism used by the set of applications. Lastly, the smart TV operating system may not include one or more drivers configured to support the communication between a secondary television receiver and the primary television receiver by which the A/V content is obtained.

Embodiments detailed herein can deal with these challenges and others. A custom software stack within the smart TV operating system can be configured to execute in parallel with the native software stack provided by the smart TV operating system. Existing sets of software applications configured to obtain the A/V content from primary television receivers may then be installed in the custom software stack. The modifications may enable the software applications in the custom software stack to interact with processes in the native stack while maintaining their original functionality and portability across multiple platforms. Installing a parallel software stack may reduce the complexity of developing new software applications for the smart TV operating system in addition to creating an environment where other functionalities may be quickly and easily integrated.

Figure 1:
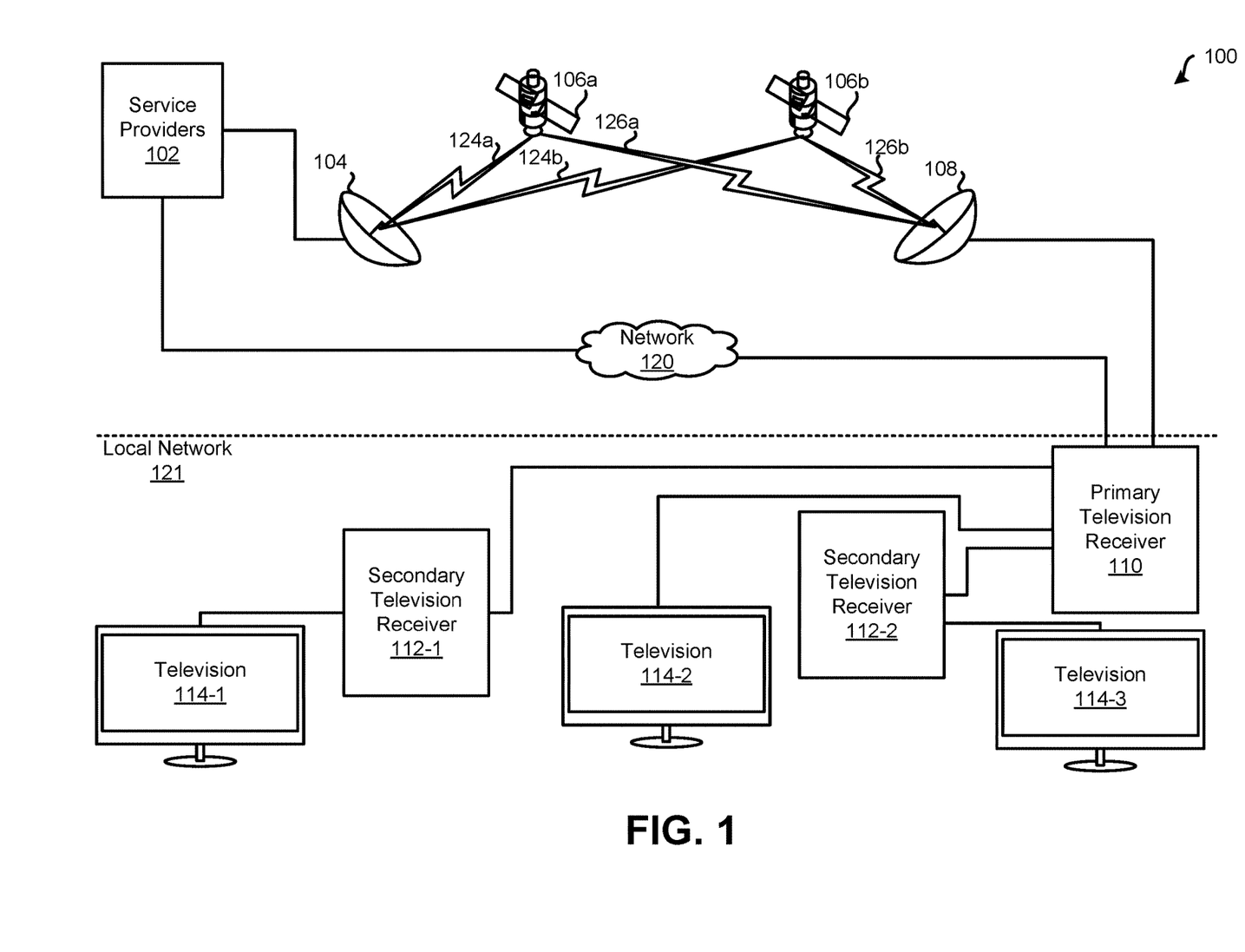
FIG. 1 illustrates an embodiment of a television content distribution system for smart television integrated devices.

Further detail regarding the integration of custom software stacks into smart TV operating systems to provide smart TV integrated television receivers is provided in relation to the figures. FIG. 1 illustrates an embodiment of a television content distribution system for smart television integrated devices. For brevity, system 100 is depicted in a simplified and conceptual form, and may generally include more or fewer systems, devices, networks, and/or other components as desired. Further, the number and type of features or elements incorporated within system 100 may or may not be implementation-specific, and at least some of the aspects of system 100 may be similar to a cable television distribution system, an IPTV (Internet Protocol Television) content distribution system, and/or any other type of media or content distribution system.

System 100 may also include at least one network 120 that may facilitate bi-directional communication for data transfer between primary television receiver 110 and service providers 102. Network 120 is intended to represent any number of terrestrial and/or non-terrestrial network features or elements. For example, network 120 may incorporate or exhibit any number of features or elements of various wireless and/or hardwired packet-based communication networks such as, for example, a WAN (Wide Area Network) network, a HAN (Home Area Network) network, a LAN (Local Area Network) network, a WLAN (Wireless Local Area Network) network, the Internet, a cellular network, or any other type of communication network configured such that data may be transferred between and among respective elements of the system 100.

System 100 may also include at least one local network 121 that establishes a bi-directional communication path for data transfer between and among primary television receiver 110, secondary television receivers 112, and televisions 114 of the example system 100. Local network 121 may correspond to a home computing environment. Primary television receiver 110, together with secondary television receivers 112 and televisions 114, may each be incorporated within or form at least a portion of a particular home computing network.

Primary television receiver 110 and secondary television receivers 112 may correspond to television receivers, television converters, etc., such as a set-top box (STB) for example, configured as smart TV content receivers. In another example, primary television receiver 110 and secondary television receivers 112, may exhibit functionality integrated as part of or into a television, a DVR (Digital Video Recorder), a computer such as a tablet computing device, or any other computing system or device, as well as variations thereof. Further, primary television receiver 110 may be configured so as to enable communications in accordance with any particular communication protocol(s) and/or standard(s) including, for example, TCP/IP (Transmission Control Protocol/Internet Protocol), DLNA/DTCP-IP (Digital Living Network Alliance/Digital Transmission Copy Protection over Internet Protocol), HDMI/HDCP (High-Definition Multimedia Interface/High-bandwidth Digital Content Protection), etc. For example, as disclosed further herein, one or more of the various elements or components of the local network 121 may be configured to communicate in accordance with the MoCA® (Multimedia over Coax Alliance) home entertainment networking standard. Still other embodiments are possible.

In practice, satellites 106a-b may each be configured to receive uplink signals 124a-b from satellite uplink 104. In this example, each of uplink signals 124a-b may contain one or more transponder streams of particular data or content, such as one or more particular television channels, as supplied by service providers 102. For example, each of the respective uplink signals 124a-b may contain various media content such as encoded HD (High Definition) television channels, SD (Standard Definition) television channels, on-demand programming, programming information, and/or any other content in the form of at least one transponder stream, and in accordance with an allotted carrier frequency and bandwidth. In this example, different media content may be carried using different ones of satellites 106a-b.

Satellites 106a-b may further be configured to relay uplink signals 124a-b to satellite dish 108 as downlink signals 126a-b. Similar to uplink signals 124a-b, each of downlink signals 126a-b may contain one or more transponder streams of particular data or content, such as various encoded and/or at least partially electronically scrambled television channels, on-demand programming, etc., in accordance with an allotted carrier frequency and bandwidth. Downlink signals 126a-b, however, may not necessarily contain the same or similar content as a corresponding one of uplink signals 124a-b. For example, uplink signal 124a may include a first transponder stream containing at least a first group or grouping of television channels, and downlink signal 126a may include a second transponder stream containing at least a second, different group or grouping of television channels. In other examples, the first and second group of television channels may have one or more television channels in common. In sum, there may be varying degrees of correlation between uplink signals 124a-b and downlink signals 126a-b, both in terms of content and underlying characteristics. Further, satellite television signals may be different from broadcast television or other types of signals. Satellite signals may include multiplexed, packetized, and modulated digital signals. Once multiplexed, packetized and modulated, one analog satellite transmission may carry digital data representing several television stations or service providers. Some examples of service providers include HBO®, CBS®, ESPN®, etc.

Satellite dish 108 may be provided to receive television channels (e.g., on a subscription basis) provided by service providers 102, satellite uplink 104, and/or satellites 106a-b. For example, satellite dish 108 may be configured to receive particular transponder streams, or downlink signals 126a-b, from one or more of satellites 106a-b. As another example, satellite dish 108 may be configured to provide a plurality of television channel frequencies to a television frequency tuner of primary television receiver 110. Additionally, primary television receiver 110, which is communicatively coupled to satellite dish 108, may subsequently select via a tuner, decode, and relay particular transponder streams to television 114-2 for display thereon. For example, satellite dish 108 and primary television receiver 110 may, respectively, be configured to receive, decode, and relay at least one premium HD-formatted television channel to television 114-2. As another example, primary television receiver 110 may be configured to tune a television frequency tuner to a television channel frequency of a plurality of television channel frequencies received by satellite dish 108. Programming or content associated with the HD channel may generally be presented live, or from a recording as previously stored on, by, or at primary television receiver 110. Here, the HD channel may be output to television 114-1 in accordance with the HDMI/HDCP content protection technologies. Other embodiments are however possible. For example, the HD channel may be output to television 114-1 in accordance with the MoCA® (Multimedia over Coax Alliance) home entertainment networking standard.

Further, primary television receiver 110 may select via a tuner, decode, and relay particular transponder streams to one or both of secondary television receivers 112, which may in turn relay particular transponder streams to a corresponding television of televisions 114 for display thereon. For example, satellite dish 108 and primary television receiver 110 may, respectively, be configured to receive, decode, and relay at least one television channel to television 114-1 by way of secondary television receiver 112-1. Similar to the above-example, the television channel may be presented live, or from a recording as previously stored on primary television receiver 110, and may be output to television 114-1 by way of secondary television receiver 112-1 in accordance with a particular content protection technology and/or networking standard.

As disclosed above, primary television receiver 110 and secondary television receivers 112 may be configured with a client-server architecture within the local network 121. Each secondary television receiver 112 may operate and stream A/V content without communicating directly to a cloud server (e.g., without communicating to a remote system via the network 120). Each secondary television receiver 112 may obtain the majority or all of its content from primary television receiver 110 with which the secondary television receiver 112 is communicatively coupled (e.g., via one or a combination of MoCA, Wi-Fi, and/or the like) in local network 121. In some examples, each secondary television receiver 112 may obtain OTA updates and smart TV OS-specific file format packages from primary television receiver 110.

Figure 2:
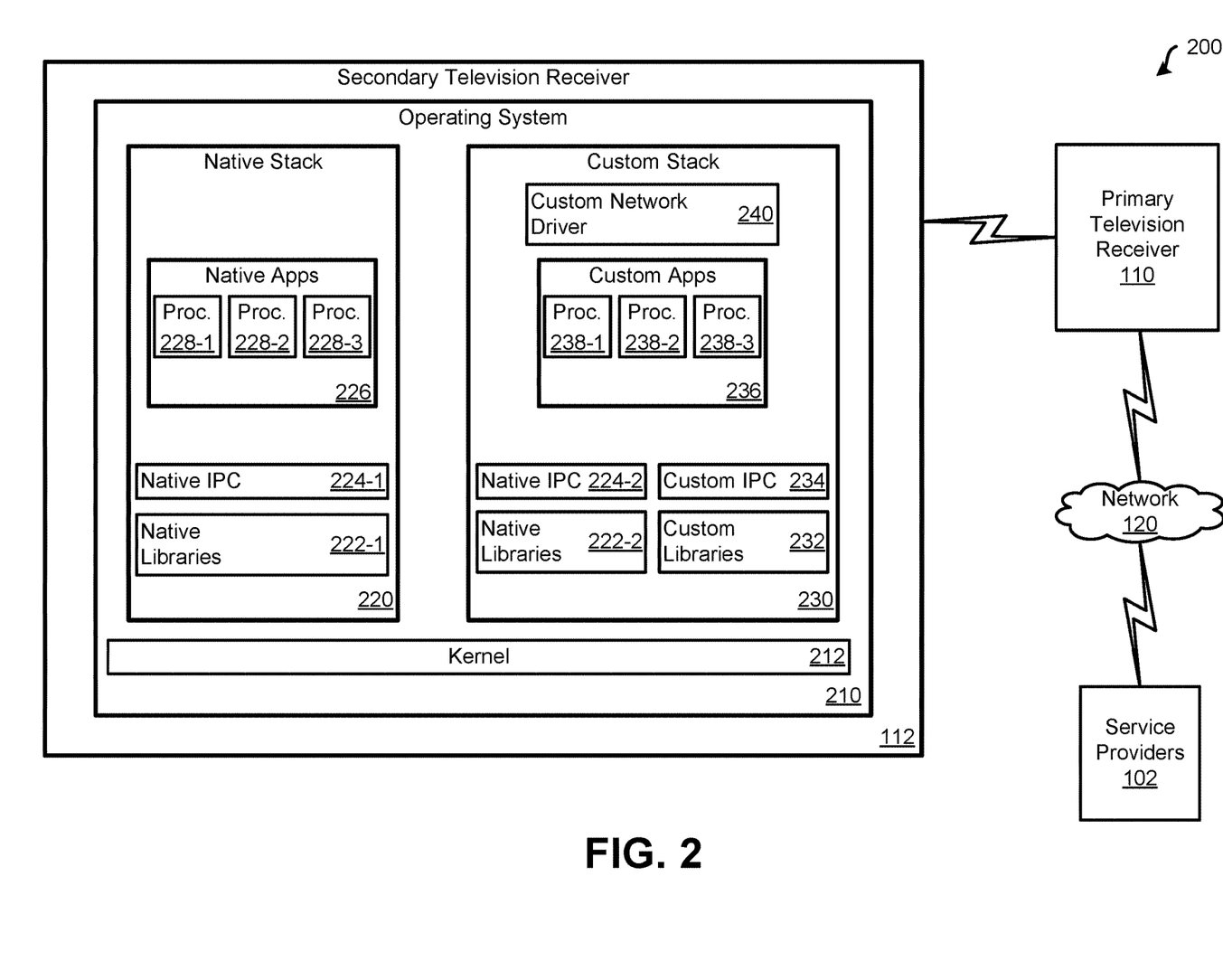
FIG. 2 illustrates an embodiment of a smart television integrated television receiver within a television receiver system.

FIG. 2 illustrates an embodiment of a smart television integrated television receiver within a television receiver system 200. Television receiver system 200 can include service providers 102, primary television receiver 110, and secondary television receiver 112. Network 120 may function as described above. For example, network 120 may provide a connection between service providers 102 and primary television receiver 110. Additionally, or alternatively, primary television receiver 110 may be connected to service providers 102 via a satellite connection. For example, as described above, primary television receiver 110 may be coupled with a satellite antenna configured to receive data from one or more satellites.

Service providers 102 may include one or more remote services configured to provide digital content such as live television channels, subscription television shows, streaming movies, streaming audio, shopping, etc. to a requesting device, such as primary television receiver 110. Service providers 102 may distribute digital content via network 120, such as the Internet. Additionally, or alternatively, service providers 102 may distribute digital content via direct broadcast satellite services.

In some embodiments, primary television receiver 110 is part of multiple different networks. For example, primary television receiver 110 may communicate with service providers 102 via the Internet. Additionally or alternatively, primary television receiver 110 may communicate with secondary television receiver 112 via a local network. In some embodiments, primary television receiver 110 has a direct connection to network 120 while secondary television receiver 112 does not have a direct connection to network 120. For example, secondary television receiver 112 may route some or all communication to network 120 via primary television receiver 110. Incoming communication from network 120 may also be received bay primary television receiver 110 and routed to secondary television receiver 112. In this way, secondary television receiver 112 may still receive and consume services from service providers 102 without having a direct connection with network 120.

Primary television receiver 110 may include an operating system configured to execute one or more processes. The one or more processes may configure primary television receiver 110 to receive digital content from service providers 102 and provide the digital content to secondary television receiver 112 in response to a request received by primary television receiver 110 from secondary television receiver 112. For example, secondary television receiver 112 may be configured to transmit a request to primary television receiver 110 to tune one or more television frequency tuners of primary television receiver 110 to a specific frequency associated with a television channel and stream the content received at the specific frequency back to secondary television receiver 112. As another example, secondary television receiver 112 may be configured to transmit a request to primary television receiver 110 to provide digital content previously recorded and/or stored by primary television receiver 110 to secondary television receiver 112.

Secondary television receiver 112 can include operating system 210. Operating system 210 may include one or more components configured to manage various hardware and software resource of secondary television receiver 112. For example, operating system 210 may include one or more drivers configured to display digital content on a television screen communicatively coupled with secondary television receiver 112, such as television 114 as described above. In some embodiments, operating system 210 is different from the operating system included in primary television receiver 110. For example, while primary television receiver 110 may be configured to operate using a Linux-based operating system, operating system 210 may be a Linux based operating system that configures secondary television receiver 112 to function as an Android TV content receiver device.

Operating system 210 can include kernel 212. Kernel 212 may include one or more services at the core of operating system 210. For example, kernel 212 may facilitate interactions between hardware and software components of secondary television receiver 112. Kernel 212 may control various hardware resources, such as input and output (I/O) devices, memory, peripherals etc. via device drivers, and optimize utilization of common resources such as a central processing unit (CPU), cache memory, file systems, and network sockets. One or more software stacks can be installed on kernel 212. For example, native software stack 220 and custom software stack 230 may each be installed on kernel 212. Native software stack 220 may include a default software stack for operating system 210. Custom software stack 230 may be a separate software stack loaded onto operating system 210. In some embodiments, one or more components of custom software stack 230 are loaded onto operating system 210 using a custom loader.

Native software stack 220 can include native libraries 222-1, native inter process communication (IPC) mechanism 224-1, and native applications 226. One or more components of native software stack 220 may be specially designed to execute within operating system 210 and/or on kernel 212. For example, native libraries 222 may be compiled specifically for operating system 210. As another example, native libraries 222 may include one or more libraries selected to provide a specific set of tools and/or functions to the processes configured to execute in native software stack 220. Native libraries 222 may include one or more libraries that provide macros, type definitions, and functions for tasks such as string handling, mathematical computations, and memory management, among other operating system services. Native libraries 222 may provide an interface between higher level processes such as native applications 226 and services provided by kernel 212. In some embodiments, native libraries 222 include an implementation of the standard C library, such as Bionic C library.

Native applications 226 may include one or more processes 228 configured to execute in native software stack 220. One or more processes 228 may be configured to provide one or more functions of operating system 210. For example, one or more processes 228 may be configured to provide graphical user interface (GUI) functionalities such as presenting a menu on a display coupled with secondary television receiver 112 and/or playing and recording media. As another example, one or more processes 228 may be configured to manage inputs from other devices such as a remote control device.

Native IPC mechanism 224 may be a framework for the exchange of signals and data across one or more processes 228. For example, native IPC mechanism 224 may be used for message passing and or remote procedure calls between one or more processes 228 that execute in native software stack 220. In some embodiments, kernel 212 includes native IPC mechanism 224. For example, native IPC mechanism 224 may be a kernel driver. In some embodiments, native libraries 222 are configured to provide native IPC mechanism 224. For example, one or more of processes 228 may make use of a shared library provided by native libraries 222 to interact with native IPC mechanism 224. In some embodiments, native IPC mechanism 224 includes the Binder framework provided by Android®.

Custom software stack 230 can include native libraries 222-2 and native IPC mechanism 224-2. Custom software stack 230 can also include custom libraries 232, custom IPC mechanism 234, custom applications 236, and custom network driver 240. Native libraries 222-2 and native IPC mechanism 224-2 may provide the same functionalities and services to custom software stack 230 as native libraries 222-1 and native IPC mechanism 224-1 described above with respect to native software stack 220. In some embodiments, native libraries 222-2 include a ported version of native libraries 222-1 configured to be integrated with one or more other components of custom software stack 230.

Custom applications 236 may include one or more processes 238 configured to execute in custom software stack 220. One or more processes 238 may be configured to provide one or more functions of operating system 210 related to retrieving and/or presenting digital content from primary television receiver 110. For example, one or more processes 238 may be configured to generate and/or transmit a tuning request to primary television receiver 110. The tuning request may indicate a television channel and/or a television frequency associated with a particular television channel receivable by primary television receiver 110, as described above. As another example, one or more processes 238 may be configured to receive digital content from primary television receiver 110 and transmit the digital content to a television coupled with secondary television receiver 112.

In some embodiments, one or more processes 238 of custom applications 236 interact with one or more processes 228 of native applications 228 to provide digital content to a user of secondary television receiver 112. For example, one or more processes 238 may transmit digital content to one or more processes 228 to present the digital content on a television coupled with secondary television receiver 112. As another example, one or more processes 228 may receive and interpret inputs from a user and provide GUI navigation input to one or more processes 238.

In some embodiments, one or more components of custom software stack 230 may be designed to execute on multiple operating systems and/or computer architectures. For example, custom applications 236 may be configured to be executable by the operating system of primary television receiver 110. As another example, custom applications 236 may be configured to be executable on a secondary television receiver with an operating system that is different compared with operating system 210.

Custom libraries 232 may include one or more libraries selected to provide the tools and/or functions to enable custom applications 236 to execute across multiple platforms and/or operating system such as operating system 210. Custom libraries 232 may also include one or more libraries not included in native libraries 222. For example, native libraries 222 may not include one or more libraries required by custom IPC mechanism 234. In some embodiments, custom libraries 232 include an implementation of the standard C library that is different compared with an implementation included in native libraries 222. For example, custom libraries 232 may include an implementation of the standard C library configured to provide custom IPC mechanism 234 to custom software stack 230. In some embodiments, custom applications 236 are configured to use custom IPC mechanism 234 to exchange signals and data between processes 238 of custom applications 236. Custom IPC mechanism 234 may include the System V IPC mechanism.

Custom network driver 240 may include a device driver configured to provide one or more network interfaces to native software stack 220 and/or custom software stack 230. The network interfaces provided by custom network driver 240 may enable secondary television receiver 112 to transmit data to, and/or receive data from, primary television receiver 110. In some embodiments, custom network driver 240 is configured to provide a network interface using the MoCA standard. For example, custom network driver 240 may be configured to control a MoCA adapter coupled with secondary television receiver 112. Custom network driver 240 may then maintain a network connection over coaxial cable with other devices connected via coaxial cables.

Figure 3:
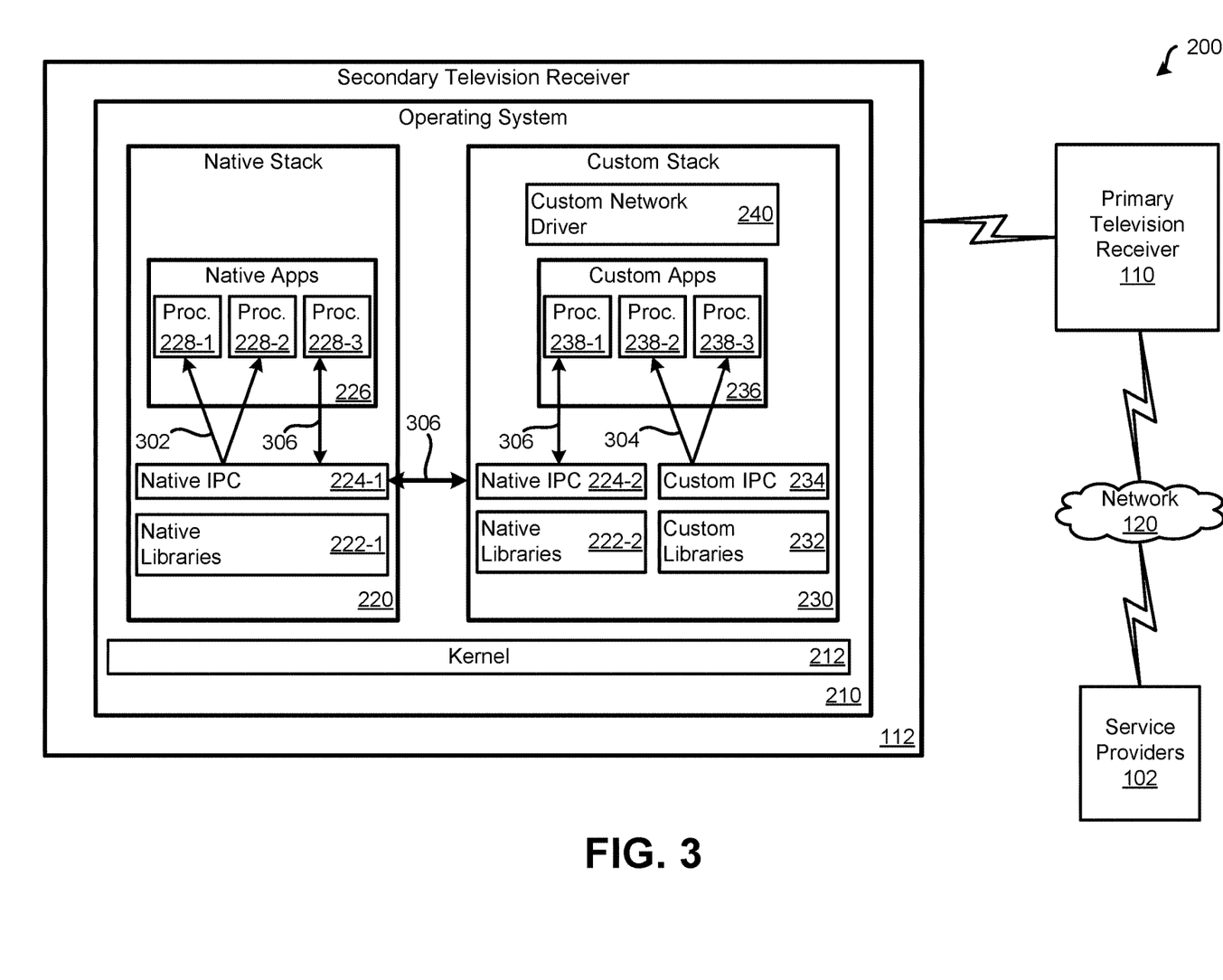
FIG. 3 illustrates an embodiment of communication between processes on a smart television integrated television receiver within a television receiver system.

FIG. 3 illustrates an embodiment of communication between processes on a smart television integrated television receiver within a television receiver system 200. As described above, one or more processes 228 of native applications 226 may communicate with other processes of native applications 226. Communication between processes may include synchronous function calls, asynchronous function calls, data transmission, memory sharing, etc. In some embodiments, each process of native applications 226 uses native IPC mechanism 224 to communicate with other processes of native applications 226. For example, as illustrated by bi-directional communication 302, process 228-1 may communicate with process 228-2 using native IPC mechanism 224-1.

As further described above, one or more processes 238 of custom applications 236 may communicate with other processes of custom applications 238. For example, a launcher process may be configured to instantiate and/or manage one or more processes 238 of custom applications 236. In some embodiments, each process of custom applications 236 uses custom IPC mechanism 234 to communicate with other processes of custom applications 236. For example, as illustrated by bi-directional flow of communication 304, process 238-2 may communicate with process 238-3 using custom IPC mechanism 234. Similarly, process 238-3 may communicate with other processes of custom applications 236 using custom IPC mechanism 234.

In some embodiments, one or more processes 238 of custom applications 236 are configured to communicate with one or more processes 228 of native applications 226. For example, one or more processes 238 may transmit digital content to one or more processes 228 to present the digital content on a television coupled with secondary television receiver 112. After receiving the digital content, one or more processes 228 may process the digital content for display by the television using one or more hardware abstraction layer (HAL) interfaces. As another example, one or more processes 238 may register with one or more processes 228 to receive input commands from a user of secondary television receiver 112. When one or more processes 228 receive the input commands (e.g., from a remote control device coupled with secondary television receiver 112), they may proceed to distribute the input commands to one or more processes 238 registered to receive the input commands.

In some embodiments, one or more processes 238 of custom applications 236 are configured to use native IPC mechanism 224 to communicate with one or more processes 228 of native applications 226. That is to say, one or more processes 238 of custom applications 236 may be configured to use multiple IPC mechanisms depending on the process to which one or more processes 238 is attempting to communicate. For example, as illustrated by bi-directional communications 306, process 238-1 may use native IPC mechanism 224-2 and native IPC mechanism 224-1 to communicate with process 228-3. Native IPC mechanism 224-1 and native IPC mechanism 224-2 may be instantiations of the same IPC mechanism, such as the Binder IPC framework, provided by native libraries 222-1 and native libraries 222-2 respectively. However, to process 238-1 and process 228-3, native IPC mechanism 224-2 and native IPC mechanism 224-1 may appear to function as a single IPC mechanism. Accordingly, one or more processes 228 may communicate with one or more processes 238 as though they were in the same software stack.

Figure 4:
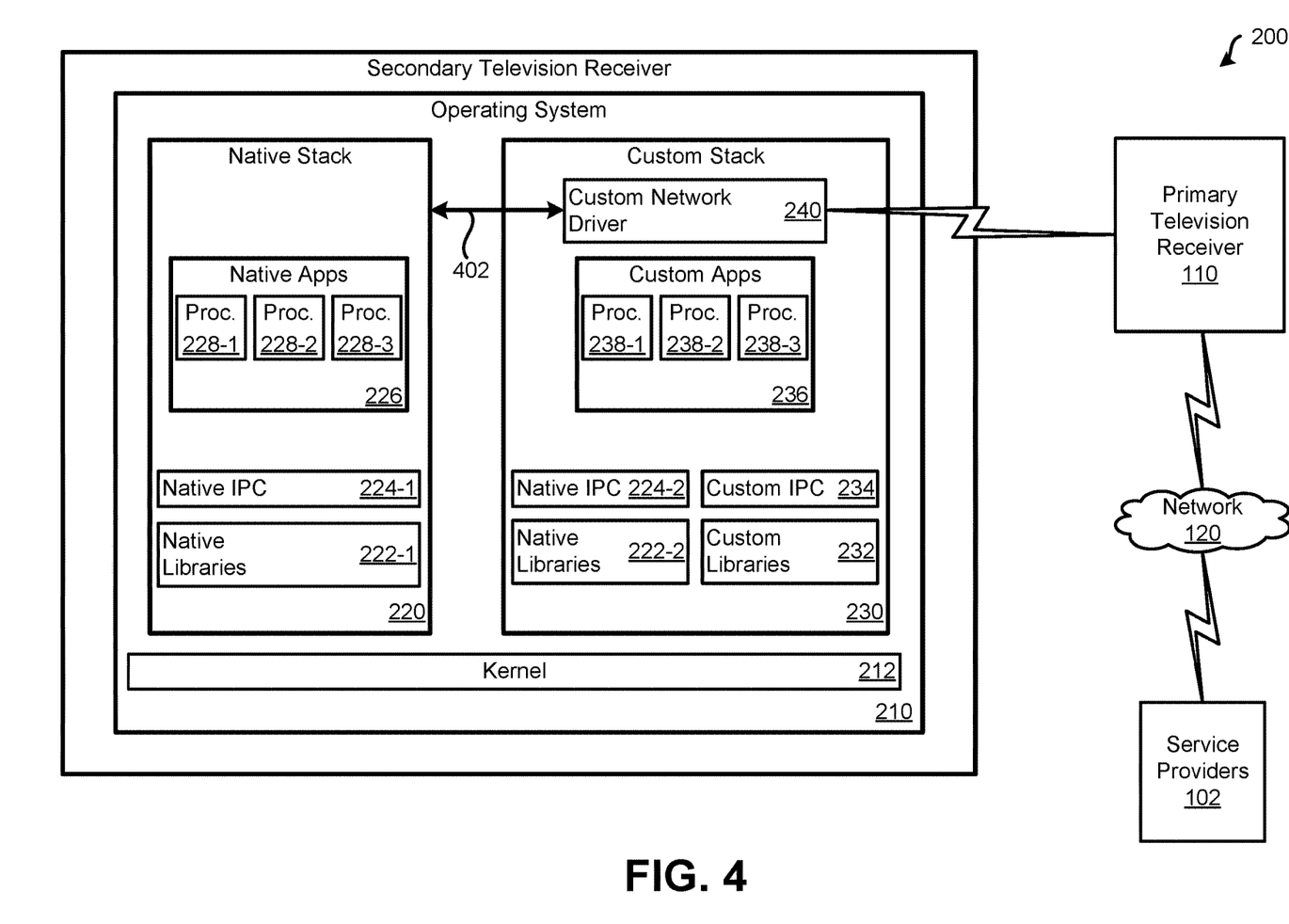
FIG. 4 illustrates an embodiments of network communications within a television receiver system.

FIG. 4 illustrates an embodiments of network communications within a television receiver system 200. As described above, secondary television receiver 112 may be configured to be in communication with primary television receiver 110. For example, secondary television receiver 112 may request and/or receive digital content from primary television receiver 110. As another example, secondary television receiver 112 may communicate with one or more services and/or devices connected to network 120 via primary television receiver 110. Secondary television receiver 110 and primary television receiver 110 may be included in a local network. For example, the local network may include one or more primary television receivers, such as primary television receiver 110, and one or more secondary television receivers, such as secondary television receiver 112. Each television receiver in the local network may form an identifiable node in the network, such that each node can discover and communicate with other nodes of the network.

In some embodiments, secondary television receiver 112 and primary television receiver 110 are communicatively coupled using one or more coaxial cables. For example, secondary television receiver 112 and primary television receiver 110 may include physical connections configured to receive a coaxial cable. Once coupled using coaxial cable, secondary television receiver 112 and primary television receiver may utilize the MoCA standards for bi-directional communications between secondary television receiver 112 and primary television receiver 110.

In some embodiments, secondary television receiver 112 includes a physical MoCA adapter configured to transmit and receive data via coaxial cables. Custom network driver 240 of custom software stack 230 may be configured as an interface to the physical MoCA adapter. For example, custom network driver 240 may configure the physical MoCA adapter to connect secondary television receiver 112 with primary television receiver 110 as a node within a local network. As another example, custom network driver 240 may be configured to provide virtual network interface 402 to operating system 210 and/or kernel 212. Virtual network interface 402 may act as a network interface between native software stack 220 and primary television receiver 110.

In some embodiments, native applications 226 and/or custom applications 236 do not require any special configuration to use virtual network interface 402 provided by custom network driver 240 to communicate with primary television receiver 110 and/or network 120. Put differently, native applications 226 and/or custom applications 236 may not determine that the physical connection between secondary television receiver 112 and primary television receiver 110 is via coaxial cable in order to use virtual network interface 402 to communicate with primary television receiver 110 and/or network 120.

Figure 5:
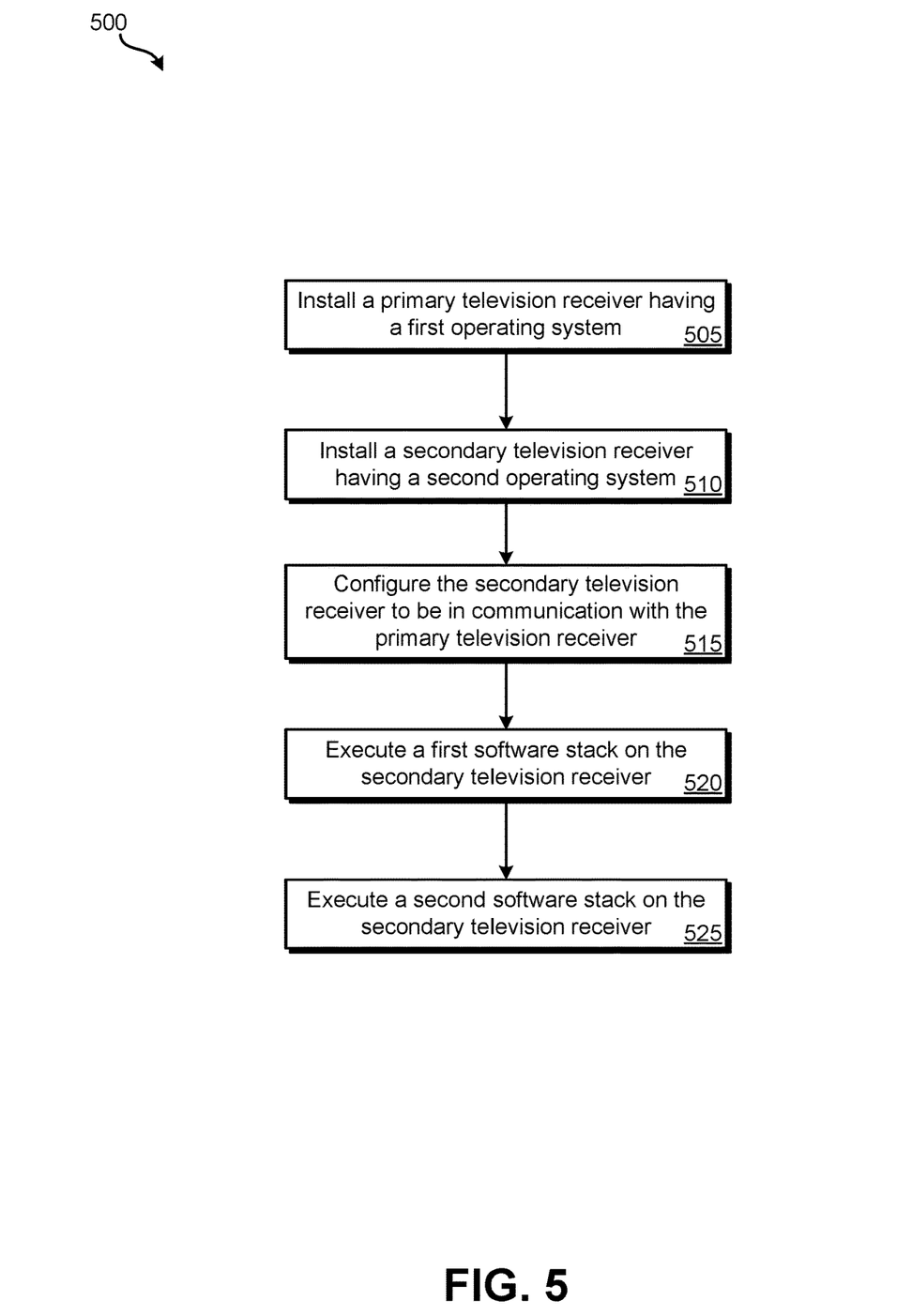
FIG. 5 illustrates an embodiment of a method for facilitating smart television content.

Various methods may be performed using the systems and arrangements detailed in relation to FIGS. 1-4. FIG. 5 illustrates an embodiment of a method 500 for facilitating smart television content. Method 500 may be performed within a building or structure such as a home, an office building, a hotel, an apartment building, or other structure where digital content is to be received and presented at a digital display. Additionally, some blocks of method 500 may be performed at a remote location, such as a factory where the devices and/or components are manufactured or assembled, while other blocks of method 500 may be performed at a customer site. Method 500 may be performed by a technician associated with a digital content provider. Alternatively, method 500 may be performed by a user and/or customer of a digital content provider. In some embodiments, some blocks of method 500 are be performed by a technician while other blocks of method 500 are performed by a customer.

Method 500 may include, at block 505, installing a primary television receiver having a first operating system. The primary television receiver may be the same, or function in a similar manner as primary television receiver 110 as described above. In some embodiments, the primary television receiver is configured to receive digital content from a remote content provider. The digital content may include audio, video, photo, text, or other digital content.

In some embodiments, installing the primary television receiver includes coupling the primary television receiver with a satellite antenna. Coupling the primary television receiver with a satellite antenna may configure the primary television receiver to receive digital content from a remote content provider. For example, the satellite antenna may be configured to receive data at one or more frequencies transmitted via one or more satellites controlled and operated by a remote content provider. The primary television receiver may then use one or more software and/or hardware frequency tuners to receive the data and process the data into the digital content transmitted by the remote content provider.

Additionally, or alternatively, installing the primary television receiver may include coupling the primary television receiver with a network, such as the Internet. For example, the primary television receiver may be coupled with a router or internet Modem connected via a wired connection with the Internet. Coupling the primary television receiver with the Internet may configure the primary television receiver to transmit data to, and/or receive data from, one or more remote service providers, such as a media streaming provider. In some embodiments, the primary television receiver is configured to receive digital content from a remote content provider via a wired network connection and/or a satellite connection. For example, the primary television receiver may stream digital content from a remote content provider via the Internet. As another example, the primary television receiver may additionally, or alternatively, receive live television channels, at one or more frequencies, from a satellite broadcast system.

In some embodiments, the primary television receiver is further configured to distribute digital content to one or more devices in communication with the primary television receiver in response to a request for the digital content. For example, after receiving the digital content from a remote content provider, the primary television receiver may transmit some or all of the digital content to a secondary television receiver, as further described below. Additionally, or alternatively, the primary television receiver may be configured to present the digital content at a digital display coupled with the primary television receiver. For example, after processing the digital content, the primary television receiver may transmit the digital content to a television coupled with the primary television receiver for display.

At block 510, a secondary television receiver having a second operating system is installed. The secondary television receiver may be the same, or function in a similar manner as secondary television receiver 112 as described above. In some embodiments, the second operating system of the secondary television receiver is different from the first operating system of the primary television receiver. For example, the first operating system may be a Linux based operating system configured for digital content distribution while the second operating system is an Android based operating system configured to provide smart television content and services at a television coupled with the secondary television receiver. Installing the secondary television receiver may include coupling the secondary television receiver with a television. Installing the secondary television receiver may also include coupling the secondary television receiver with the primary television receiver, as further described below.

In some embodiments, the secondary television receiver is configured to receive digital content from a primary television receiver. For example, the secondary television receiver may be configured to transmit a tuning request to the primary television receiver. After processing the tuning request, the primary television receiver may tune a television frequency tuner to a frequency indicated by the tuning request and transmit digital content received at the indicated frequency to the secondary television receiver.

In some embodiments, the secondary television receiver is further configured to provide the digital content to a display communicatively coupled with the secondary television receiver for presentation. For example, after receiving the digital content from the primary television receiver, the secondary television receiver may process the digital content for display by a television coupled with the secondary television receiver.

At block 515, the secondary television receiver is configured to be in communication with the primary television receiver. In some embodiments, configuring the secondary television receiver to be in communication with the primary television receiver includes coupling the secondary television receiver to the primary television receiver via a wired connection. For example, the secondary television receiver and the primary television receiver may be coupled using a coaxial cable. Additionally, or alternatively, the secondary television receiver and the primary television receiver may be coupled using another type of wired connection, such as an Ethernet connection, or a wireless connection, such as via Wi-Fi. The secondary television receiver may include a driver configured to provide a network interface between one or more processes executable by the secondary television receiver and the primary television receiver. For example, the driver may configure and manage a physical network interface, such as a MoCA adapter, an Ethernet adapter, or a wireless radio adapter.

In some embodiments, configuring the secondary television receiver to be in communication with the primary television receiver enables the secondary television receiver to send data to, and/or receive data from, the Internet. For example, network communication intended for one or more recipients connected to the Internet may be transmitted/received via the primary television receiver. Put differently, the secondary television receiver may be configured to send data to, and receive data from, the Internet via only the primary television receiver.

At block 520, a first software stack is executed on the secondary television receiver. The first software stack may be executed on the secondary television receiver when the secondary television receiver is initially connected to a power source. Additionally, or alternatively, the first software stack may be executed each time the second operating system of the secondary television receiver boots up. The first software stack may include a set of processes, drivers, and/or libraries as predefined and/or provided for by a developer of the second operating system.

The first software stack may be the same, or function in a similar manner, as native software stack 220 described above. For example, the first software stack may include a first inter-process communication (IPC) mechanism. The first IPC mechanism may include the Binder framework IPC as provided by one or more native libraries included in the first software stack. The first software stack may also include one or more processes that execute in the first software stack. In some embodiments, each of the one or more processes that execute in the first software stack use the first IPC mechanism to communicate with other processes that execute in the first software stack.

At block 525, a second software stack is executed on the secondary television receiver. In some embodiments, the second software stack is executed after the first software stack has been initialized. For example, a custom loader may be configured to execute after the first software stack has been initialized and/or is executing. Upon execution, the custom loader may execute and/or instantiate the second software stack in the second operating system. Executing the second software stack may include loading the second software stack from a location in a memory of the secondary television receiver. In some embodiments, the second software stack is stored in the memory of the secondary television receiver while the first software stack is executing. For example, one or more of the processes executing in the first software stack may be used to load the second software stack into the memory. Alternatively, the second software stack may be manually loaded into the memory of the secondary television receiver.

The second software stack may be the same, or function in a similar manner, as custom software stack 230 described above. For example, the second software stack may include the first IPC mechanism in addition to a second IPC mechanism. The second IPC mechanism may include the System V IPC mechanism as provided by one or more custom libraries included in the second software stack. In some embodiments, the one or more native libraries of the first software stack do not include one or more libraries required to provide the second IPC mechanism. In some embodiments, the second software stack further includes a custom network driver. The custom network driver may further configure the secondary television receiver to be in communication with the primary television receiver. For example, the custom network driver may provide a network interface with a MoCA adapter. The network interface may be configured to provide an interface between the first software stack and the primary television receiver via a coaxial cable.

The second software stack may also include one or more processes that execute in the second software stack. The one or more processes that execute in the second software stack may configure the secondary television receiver to request and/or receive digital content from the primary television receiver. For example, one process of the one or more processes may be configured to generate tuning requests, as described above, while another process may transmit the tuning request to the primary television receiver. As another example, one process of the one or more processes may be configured to receive a stream of digital content from the primary television receiver, while another process is configured to store the digital content for future access.

In some embodiments, each of the one or more processes that execute in the second software stack are configured to use the second IPC mechanism to communicate with other processes that execute in the second software stack. For example, after generating a tuning request, a first process may be configured to pass the tuning request to a second process using the second IPC mechanism in order for the second process to transmit the tuning request to the primary television receiver. One or more processes that execute in the second software stack may be further configured to use the first IPC mechanism to communicate with one or more processes that execute in the first software stack. In some embodiments, one or more processes that execute in the second software stack are further configured to execute on one or more operating systems. For example, one or more processes that execute in the second software stack may be configured to execute in the first operating system of the primary television receiver and/or a similar operating system of a different secondary television receiver.

The methods, systems, and devices discussed above are examples. Various configurations may omit, substitute, or add various procedures or components as appropriate. For instance, in alternative configurations, the methods may be performed in an order different from that described, and/or various stages may be added, omitted, and/or combined. Also, features described with respect to certain configurations may be combined in various other configurations. Different aspects and elements of the configurations may be combined in a similar manner. Also, technology evolves and, thus, many of the elements are examples and do not limit the scope of the disclosure or claims.

Specific details are given in the description to provide a thorough understanding of example configurations (including implementations). However, configurations may be practiced without these specific details. For example, well-known circuits, processes, algorithms, structures, and techniques have been shown without unnecessary detail in order to avoid obscuring the configurations. This description provides example configurations only, and does not limit the scope, applicability, or configurations of the claims. Rather, the preceding description of the configurations will provide those skilled in the art with an enabling description for implementing described techniques. Various changes may be made in the function and arrangement of elements without departing from the spirit or scope of the disclosure.

Also, configurations may be described as a process which is depicted as a flow diagram or block diagram. Although each may describe the operations as a sequential process, many of the operations can be performed in parallel or concurrently. In addition, the order of the operations may be rearranged. A process may have additional steps not included in the figure. Furthermore, examples of the methods may be implemented by hardware, software, firmware, middleware, microcode, hardware description languages, or any combination thereof. When implemented in software, firmware, middleware, or microcode, the program code or code segments to perform the necessary tasks may be stored in a non-transitory computer-readable medium such as a storage medium. Processors may perform the described tasks.

Having described several example configurations, various modifications, alternative constructions, and equivalents may be used without departing from the spirit of the disclosure. For example, the above elements may be components of a larger system, wherein other rules may take precedence over or otherwise modify the application of the invention. Also, a number of steps may be undertaken before, during, or after the above elements are considered.

What is claimed is:

1. A smart television receiver system comprising:
 a secondary television receiver having a first operating system installed, wherein the secondary television receiver comprises:
  a first software stack installed on a kernel of the first operating system, wherein:

the first software stack comprises a first inter-process communication mechanism; and
a second software stack installed on the kernel of the first operating system, wherein:
the second software stack comprises the first inter-process communication mechanism, and a second inter-process communication mechanism; and
a primary television receiver having a second operating system installed that is different from the first operating system, wherein the primary television receiver is configured to:
receive digital content from a remote content provider; and
provide the digital content from the remote content provider to the secondary television receiver in response to a request received by the primary television receiver from the secondary television receiver.

2. The smart television receiver system of claim 1, wherein:
the first software stack further comprises a first library configured to provide the first inter-process communication mechanism to the first software stack; and
the second software stack further comprises a second library configured to provide the second inter-process communication mechanism to the second software stack.

3. The smart television receiver system of claim 1, wherein:
the first inter-process communication mechanism uses Binder inter-process communications; and
the second inter-process communication mechanism uses System V inter-process communications.

4. The smart television receiver system of claim 1, wherein the second software stack further comprises a first driver configured to provide a network interface to the first software stack.

5. The smart television receiver system of claim 1, wherein:
the primary television receiver and the secondary television receiver are communicatively coupled using a coaxial cable; and
the second software stack further comprises a first driver configured to provide a network interface between the first software stack and the primary television receiver via the coaxial cable.

6. The smart television receiver system of claim 1, further comprising a satellite antenna communicatively coupled to the primary television receiver, wherein the satellite antenna is configured to provide a connection between the primary television receiver and the remote content provider.

7. The smart television receiver system of claim 1, wherein the secondary television receiver sends data to, and receives data from, the Internet via only the primary television receiver.

8. The smart television receiver system of claim 1, wherein:
a process that executes in the second software stack is configured to transmit a first tuning request to the primary television receiver; and
the primary television receiver comprises a tuner configured to tune, in response to the primary television receiver receiving the first tuning request, a frequency at which a plurality of television channels are received.

9. The smart television receiver system of claim 1, further comprising a television communicatively coupled to the secondary television receiver, wherein a first process that executes in the second software stack is configured to receive the digital content from the primary television receiver and transmit the digital content to a second process that executes in the first software stack for display by the television.

10. The smart television receiver system of claim 1, wherein one or more processes that are executed in the second software stack are configured to be executable by the second operating system of the primary television receiver.

11. A smart television receiver comprising:
a first operating system installed on the smart television receiver;
a first software stack installed on a kernel of the first operating system, wherein:
the first software stack comprises a first inter-process communication mechanism; and
a second software stack installed on the kernel of the first operating system, wherein:
the second software stack comprises the first inter-process communication mechanism, and a second inter-process communication mechanism; and
wherein the smart television receiver is configured to:
receive digital content from a remote content provider; and
provide the digital content to a display communicatively coupled with the smart television receiver for presentation.

12. The smart television receiver of claim 11, wherein:
the first software stack further comprises a first library configured to provide the first inter-process communication mechanism to the first software stack; and
the second software stack further comprises a second library configured to provide the second inter-process communication mechanism to the second software stack.

13. The smart television receiver of claim 11, wherein the smart television receiver is further configured to be communicatively coupled to a primary television receiver configured to:
receive the digital content from the remote content provider; and
provide the digital content to the smart television receiver.

14. The smart television receiver of claim 13, wherein:
the smart television receiver is further configured to be communicatively coupled to the primary television receiver using a coaxial cable; and
the second software stack further comprises a first driver configured to provide a network interface between the first software stack and the primary television receiver via the coaxial cable.

15. The smart television receiver of claim 13, wherein the smart television receiver is further configured to send data to, and receive data from, the Internet via only the primary television receiver.

16. The smart television receiver of claim 13, wherein:
a process that is executed in the second software stack is configured to transmit a first tuning request to the primary television receiver; and
the primary television receiver comprises a tuner configured to tune, in response to the primary television receiver receiving the first tuning request, a frequency at which a plurality of television channels are received.

17. The smart television receiver of claim 13, wherein one or more processes that are executed in the second software stack are configured to be executable by a second operating system installed on the primary television receiver.

18. A method for facilitating smart television content receivers, comprising:
- installing a primary television receiver having a first operating system installed, the primary television receiver configured to:
  - receive digital content from a remote content provider; and
  - distribute the digital content to one or more devices in communication with the primary television receiver in response to a request for the digital content;
- installing a secondary television receiver having a second operating system installed, the secondary television receiver configured to:
  - receive the digital content from the primary television receiver; and
  - provide the digital content to a display communicatively coupled with the secondary television receiver for presentation;
- configuring the secondary television receiver to be in communication with the primary television receiver;
- executing, on the secondary television receiver, a first software stack, wherein:
  - the first software stack comprises a first inter-process communication mechanism; and
- executing, on the secondary television receiver, a second software stack, wherein:
  - the second software stack comprises the first inter-process communication mechanism, and a second inter-process communication mechanism.

19. The method for facilitating smart television content receivers of claim 18, wherein:
- the first software stack further comprises a first library configured to provide the first inter-process communication mechanism to the first software stack; and
- the second software stack further comprises a second library configured to provide the second inter-process communication mechanism to the second software stack.

20. The method for facilitating smart television content receivers of claim 18, wherein:
- the first inter-process communication mechanism uses Binder inter-process communications; and
- the second inter-process communication mechanism uses System V inter-process communications.

* * * * *